United States Patent [19]
Flanner

[11] 4,088,026
[45] May 9, 1978

[54] LINEAR ACCELEROMETER MECHANISM

[75] Inventor: Philip D. Flanner, Pleasant Hill, Calif.

[73] Assignee: Systron-Donner Corporation, Concord, Calif.

[21] Appl. No.: 613,449

[22] Filed: Sep. 15, 1975

Related U.S. Application Data

[63] Continuation of Ser. No. 482,659, Jun. 24, 1974, abandoned, which is a continuation of Ser. No. 289,423, Sep. 15, 1972, abandoned, which is a continuation of Ser. No. 47,346, Jun. 18, 1970, abandoned.

[51] Int. Cl.$^2$ ............................................. G01P 15/08
[52] U.S. Cl. .................................. 73/497; 73/516 R; 73/517 B
[58] Field of Search ............ 73/516 R, 517 R, 517 B, 73/497; 324/155, 154 PB

[56] References Cited
U.S. PATENT DOCUMENTS

| | | | |
|---|---|---|---|
| 1,708,294 | 4/1929 | Foster ................................... | 324/155 |
| 2,802,956 | 8/1957 | Jarosh et al. .................. | 73/516 R X |
| 2,853,287 | 9/1958 | Draper et al. ..................... | 73/516 R |
| 2,899,190 | 8/1959 | Driver ................................ | 73/517 B |
| 2,985,021 | 5/1961 | Lewis et al. ........................ | 73/517 B |
| 2,995,038 | 8/1961 | Singleton et al. ................ | 73/516 R |
| 2,995,935 | 8/1961 | Eyestone et al. .................. | 73/517 B |
| 3,078,721 | 2/1963 | Sawyer ................................... | 73/497 |
| 3,111,036 | 11/1963 | Kistler ................................ | 73/517 B |
| 3,164,998 | 1/1965 | Wickenden ........................ | 73/516 R |
| 3,213,692 | 10/1965 | Sawyer ................................... | 73/497 |
| 3,246,525 | 4/1966 | Clark .................................. | 73/517 B |
| 3,331,253 | 7/1967 | Morris ................................ | 73/517 B |
| 3,438,266 | 4/1969 | Carow et al. ..................... | 73/516 R |
| 3,513,711 | 5/1970 | Rogall et al. ..................... | 73/517 B |

Primary Examiner—James J. Gill
Attorney, Agent, or Firm—Flehr, Hohbach, Test, Albritton & Herbert

[57] ABSTRACT

Linear accelerometer mechanism having a housing and a pendulous member. Means is provided for pivotally mounting the pendulous member in the housing. A torque coil is carried by the pendulous member and first and second magnets are mounted in the torque coil for establishing a magnetic field in the vicinity of the torque coil. A conducting planar element is carried by the pendulous member and pick-off means is mounted within the housing in the vicinity of the pendulous member.

23 Claims, 7 Drawing Figures

LINEAR ACCELEROMETER MECHANISM

This is a continuation, of application Ser. No. 482,659, now abandoned, filed June 24, 1974 which was a continuation of application Ser. No. 289,423, filed Sept. 15, 1972, now abandoned, which was a continuation of application Ser. No. 47,346 filed June 18, 1970, now abandoned.

BACKGROUND OF THE INVENTION

Linear accelerometer mechanisms using a pivotally mounted pendulous mass have heretofore been provided. However, in general, such mechanisms have had a number of disadvantages. In particular, they suffered from friction in the pivot and jewel assemblies used for the pivotal mounting. In addition, such mechanisms have lacked the necessary linearity and inherent alignment stability particularly with changes in temperature. Also, prior linear accelerometer mechanisms have been very costly and have been hard to make. There is, therefore, a need for a new and improved linear accelerometer mechanism.

SUMMARY OF THE INVENTION AND OBJECTS

The linear accelerometer mechanism consists of a housing. A pendulous member is provided within the housing. Means is provided for pivotally mounting the pendulous member within the housing. A torque coil is carried by the pendulous member. First and second magnets are mounted in the housing on opposite sides of the torque coil to establish a magnetic field in the vicinity of the torque coil. A conducting planar element is carried by the pendulous member and pick-off means is mounted within the housing adjacent the pendulous member. Float means is provided so that the pendulous member, the torque coil and the float means in combination are substantially neutrally buoyant.

In general, it is an object of the present invention to provide a linear accelerometer mechanism which has excellent linearity.

Another object of the invention is to provide a mechanism of the above character which is relatively inexpensive and easy to manufacture.

Another object of the invention is to provide a mechanism of the above character which makes it possible to adjust the preloading force which is placed between the pivots and jewels utilized in the mechanism.

Another object of the invention is to provide a mechanism of the above character which can be spin stabilized.

Another object of the invention is to provide a mechanism of the above character which can be readily filled with a fluid such as oil without danger of entrapment of bubbles within the housing.

Another object of the invention is to provide a mechanism of the above character in which the expansion bellows are mounted within the main housing.

Another object of the invention is to provide a mechanism of the above character in which the torque coil is shielded from external magnetic fields.

Another object of the invention is to provide a mechanism of the above character with inherent alignment stability over a large temperature range.

Another object of the invention is to provide a mechanism of the above character which is relatively insensitive to spurious forces on the pendulous member.

Additional objects and features of the invention will appear from the following description in which the preferred embodiment is set forth in detail in conjunction with the accompanying drawings.

DESCRIPTION OF THE PREFERRED EMBODIMENT

The linear accelerometer mechanism as shown in the drawings consists of four major sub-assemblies which can be identified as the end or cover assemblies 11 and 12, a center assembly 13, and a moving system assembly 14.

The end or cover assemblies 11 and 12 are identical. Each consists of a cover 16. The cover 16 is made of a suitable material such as soft steel. The cover 16 is provided with a large, generally circular recess 17 at one end and a large hole 18 which extends through the cover at the other end. The large hole 18 forms part of a chamber 19 as hereinafter described. A large bellows 20 of a conventional type is disposed in the hole 18 and is secured in place in the cover 16 by suitable means such as solder to hermetically seal the outer end of the hole 18.

Figure 1:
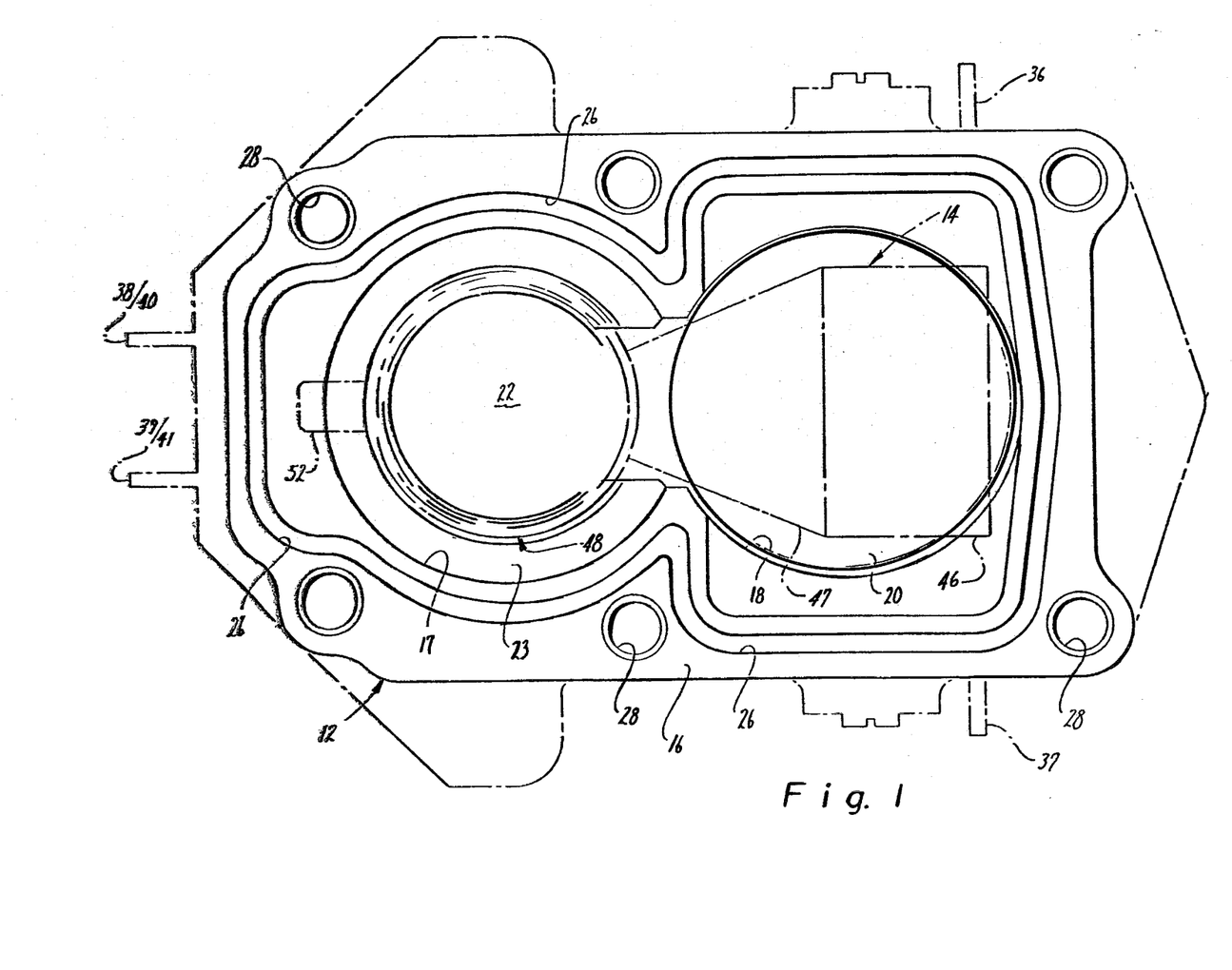
FIG. 1 is a top plan view of a linear accelerometer mechanism incorporating the present invention.
Figure 2:
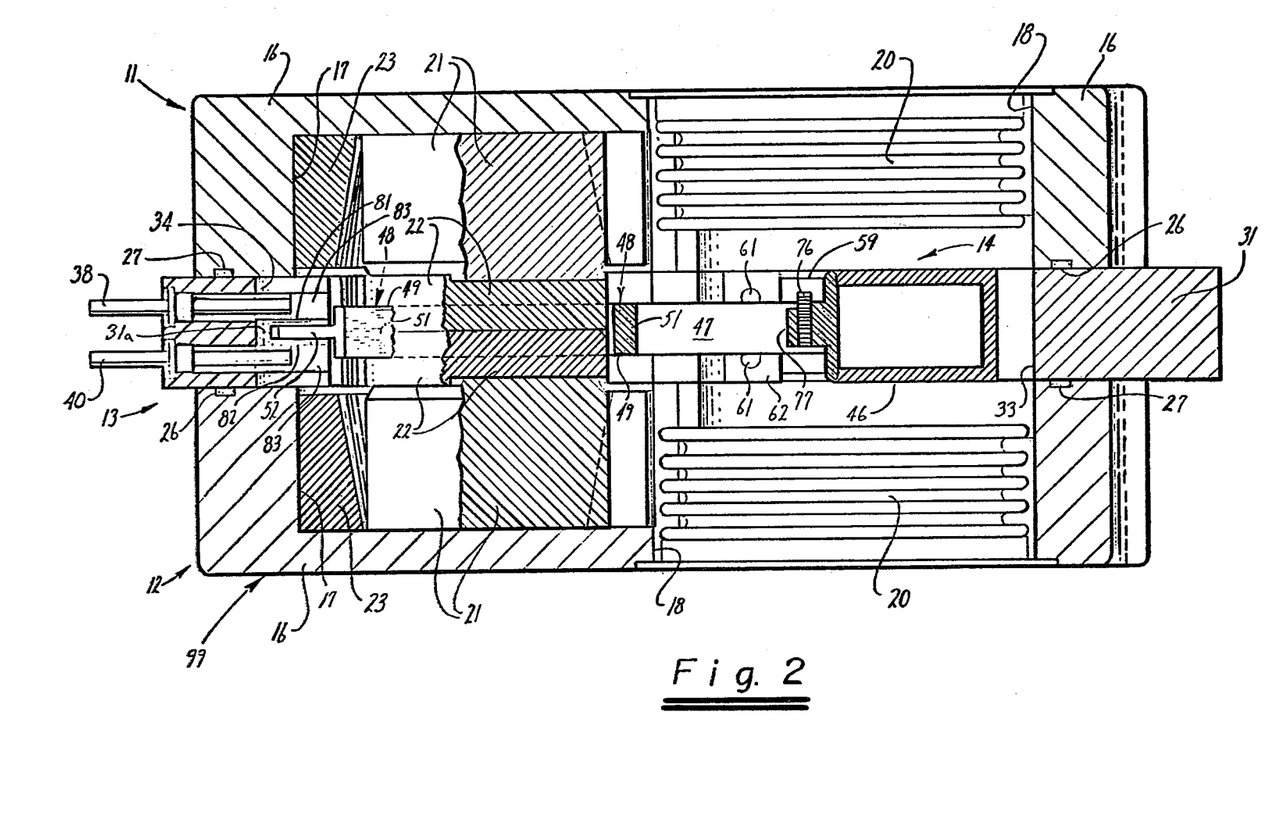
FIG. 2 is a cross-sectional view of the linear accelerometer mechanism shown in FIG. 1.

A magnet 21 formed of a suitable material such as Alnico is mounted in the recess 17 of the cover. The magnet 21 is generally cylindrical in configuration. A cylindrical pole piece 22 formed of a suitable material such as soft iron is mounted on top of the magnet 21. Both the magnet 21 and the pole piece 22 are soldered in place. A split filler ring 23 formed of a suitable material such as aluminum which has been nickel plated is provided to fill substantially all the remaining space in the recess 17. The substantially cylindrical space in the recess 17 between the magnet and the cover is provided to minimize leakage of flux into the soft iron return path which is provided by the cover so that substantially all of the flux from the magnet 21 will pass through the pole piece 22. The cover 16 is provided with a recess 26 which is adapted to receive an O-ring 27 which forms a fluid-tight seal with the center assembly 13 as can be seen particularly in FIG. 2. The cover is provided with a plurality of holes 28.

The center assembly 13 consists of a part or body 31 formed of a suitable material such as soft steel. The part 31 is provided with a circular hole 32 which is adapted to receive the pole pieces 22 mounted on the magnets 21. It is also provided with a generally rectangular hole 33 which extends therethrough and which is in communication with the hole 32. In addition, it is provided with a smaller elongate hole 34 which is in communication with the hole 32. The part 31 is provided with web portions 31a and 31b which extend into the hole 34.

A pair of terminals 36 and 37 are mounted in the part 31 for making connection to a torque coil hereinafter described. Four additional terminals 38, 39, 40 and 41 are also mounted in the part 31 and are connected to the pick-off coils as hereinafter described. The part 31 is also provided with a plurality of holes 42.

The moving system assembly 14 consists of a rectangular box 46 that is provided with five sides so as to define a predetermined volume. The sixth side is provided by a support arm 47 which is generally triangular in configuration is mounted upon the box 46 and carries a torque coil assembly 48. The support arm 47 is provided with a generally triangular open area 50. The torque coil assembly 48 consists of a bobbin 49 formed of a suitable material such as aluminum which has wound thereon many turns of a fine conducting wire such as aluminum to provide a coil 51. A paddle 52 formed of a suitable material such as aluminum is mounted on the forward extremity of the torque coil assembly 48 and generally lies in the same plane as the torque coil assembly.

Means is provided for pivotally mounting the moving system within the center assembly 13 and consists of pivot and jewel assemblies 56. Each of the pivot and jewel assemblies 56 consists of a pivot 57 formed of a suitable material such as steel which seats in a bearing 58 which may carry a jewel (not shown). The bearing 58 is mounted on one end of a triangularly shaped cantilever spring 59. The spring 59 is formed of a suitable material such as beryllium copper and is secured to the body 31 by a pair of screws 61 extending into a block 62. The spring 59 is provided with a cut-out 63 to facilitate flexing of the spring. Each of the pivot and jewel assemblies 56 includes means for biasing or adjusting the preload force or the loading between the pivot and the bearing. This consists of a small coil spring 66 which has one end adapted to engage a boss-like portion 58a provided on the bearing housing 58 and has the other end adapted to engage a boss-like portion 67a of a screw 67 which is threaded into the body 31. The screw 67 is provided with an annular recess 68 which receives an O-ring 69 to prevent leakage of fluid past the screw 67. A coil spring 71 is mounted on a collet 72 formed of a conducting material mounted upon the pivot 57 and is connected to the associated terminal of the terminals 37 and 36. The coil springs 71 are connected to opposite ends of the torque coil 51. To electrically isolate the torque coil from the body 31 either the pivot 57 or the bearing 58 can be formed of a suitable insulating material.

Means is provided for spin compensating the linear accelerometer mechanism and consists of a screw 76 which is threaded into an ear 77 provided as an integral part of the base of the triangularly shaped support arm 47. As can be seen from FIGS. 2 and 3, the ear 77 and the screw 76 threaded therein are generally centered laterally of the box 46 and between the top and bottom of the box.

Figures 4, 5, 6, 7:
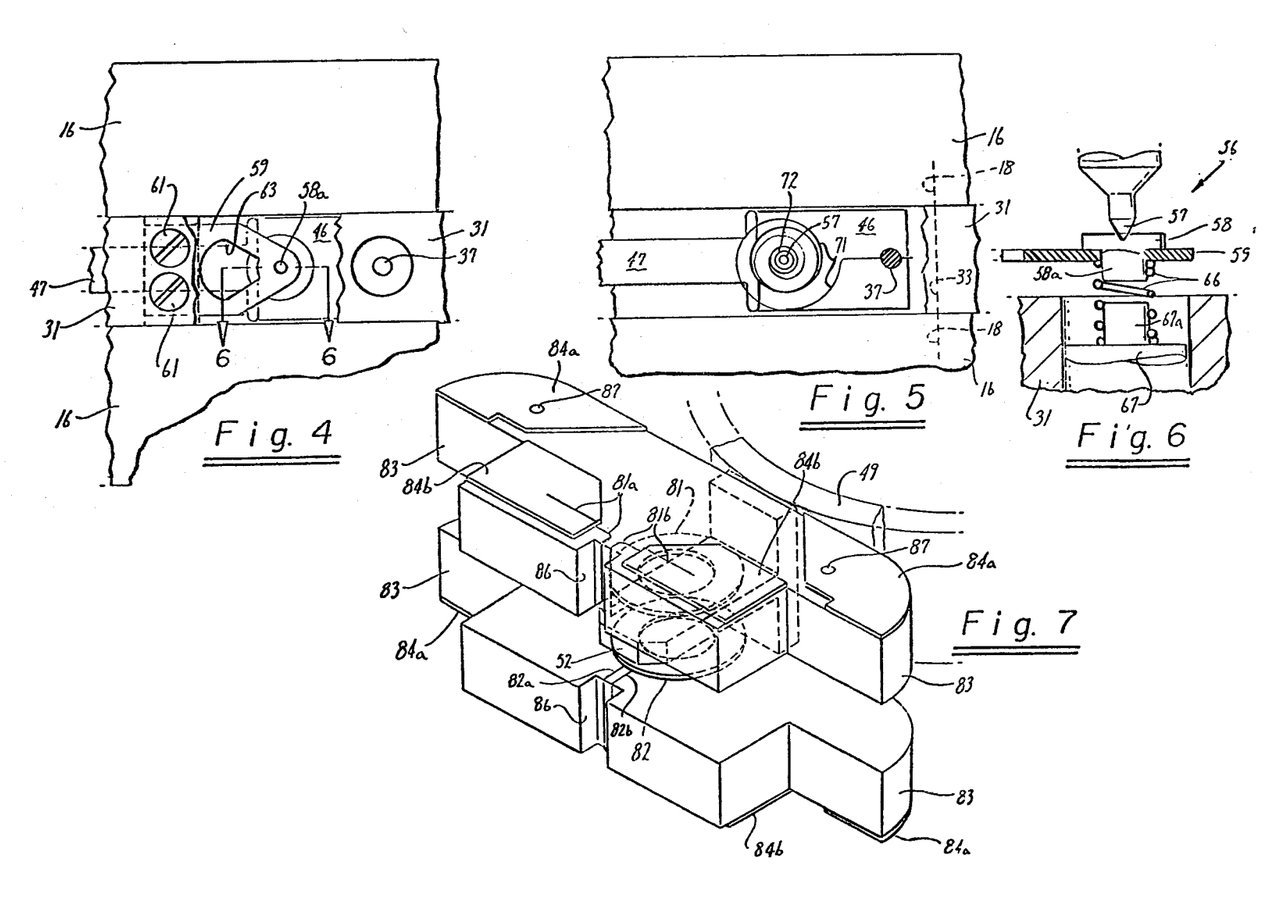
FIG. 4 is a partial side elevational view looking along the line 4—4 of FIG. 3.
FIG. 5 is a cross-sectional view looking along the line 5—5 of FIG. 3.
FIG. 6 is a cross-sectional view taken along the line 6—6 of FIG. 4.
FIG. 7 is a partial isometric view of the linear accelerometer mechanism particularly showing the positioning of the pick-off coils and the paddle.

A pair of pick-off coils 81 and 82 form a part of the center assembly 13 and are disposed on opposite sides of the paddle 52. The pick-off coils 81 and 82 are formed of very fine copper wire which is wound in place on parts 83 in the form of flat sheets formed of a suitable insulating material such as a laminate construction of the type conventionally utilized for printed circuit boards. The parts 83 are provided with one surface which has a layer of copper disposed thereon. The layer of copper has been etched away so that there remains contact portions 84a and 84b on each of the parts 83. As can be seen particularly from FIG. 7, the portions 84a and 84b are separated from each other so that they are electrically isolated from each other by the parts 83 formed of insulating material. The pick-off coils 81 and 82 are each provided with two leads 81a and 81b, and 82a and 82b which extend through slots 86 provided in the parts 83 and which are then soldered to the portions 84b as shown particularly in FIG. 7. The four terminals 38, 39, 40 and 41 are wound with fine wire which is soldered thereto and the ends of the wire are secured to the copper portions 84b so that the pins 38, 39, 40 and 41 can be utilized for making connections to the pick-off coils 81 and 82. The parts are held in place by pins 87 which extend through the web portions 31a and 31b and are soldered to the copper portions 84a. As can be seen particularly from FIG. 2, the paddle 52 is disposed between the two pick-off coils 81 and 82 in such a manner that the pick-off coils capture the paddle and serve as mechanical stops for the paddle 52 and prevent its movement beyond two extreme predetermined positions.

The part 31 is provided with two oil-filling holes 91 and 92. The hole 91 is in communication with the hole 34 in the part 31 and the hole 92 is in communication with the hole 33. A plug 93 is mounted in each of the holes 92 and is provided with an O-ring 94 to establish a seal between the plug 93 and the side wall forming the hole. A wire retaining member 96 is provided for retaining each of the plugs 93 in the desired position within the part or body 31 to seal the same.

The end or cover assemblies 11 and 12 are positioned on opposite sides of the center assembly 13 and are fastened together by a plurality of bolts 98 which extend through the same to form a case or housing 99 for the accelerometer mechanism.

Figure 3:
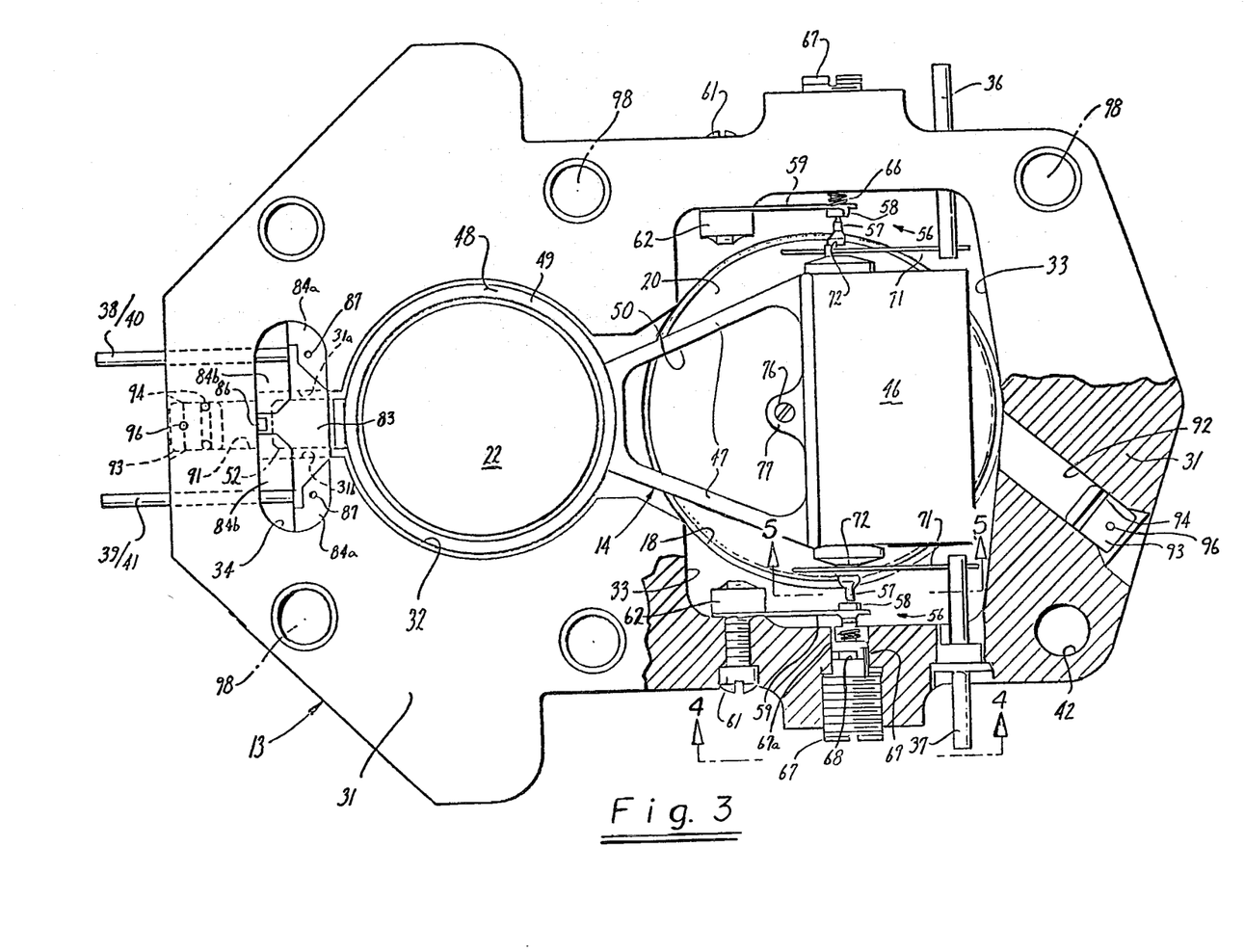
FIG. 3 is a plan view, partially in cross-section, of the center section sub-assembly of the linear accelerometer mechanism.

The linear accelerometer mechanism is filled with oil of a suitable type. In order to ensure that no bubbles will be present within the cavities of the mechanism, the mechanism is filled in a particular manner. Thus, in examining the accelerometer as it is shown in FIG. 3, the right-hand end of the accelerometer is tipped upwardly so that the hole 91 extends in a vertical direction. A stand pipe (not shown) is mounted upon the mechanism so that it is in communication with the hole 92. The entire mechanism is then placed in a chamber under a vacuum and then oil is introduced under the force of gravity through the hole 91 and permitted to flow slowly upwardly through the mechanism until the entire mechanism is filled and oil is running out of the stand pipe.

With the mechanism disposed in a vertical direction, it can be seen that the surfaces which form the holes 32, 33 and 34 have been formed in such a manner so that they all are inclined in a generally upward direction toward the hole 92 so that there is no tendency to entrap bubbles of air. For example, the upper surface of the rectangular hole or cavity 33 is inclined upwardly toward the hole 92 so that bubbles will not be trapped on the surface but will gradually move toward the hole 92 and out the stand pipe connected to the hole 92. In other words, all the internal cavities within the mechanism are shaped so that no bubbles will be entrapped within the mechanism.

After the stand pipe has been filled, the stand pipe can be removed and then the plugs 93 can be inserted.

In use of the linear accelerometer mechanism, it is utilized with electronics of the type described in co-pending application Ser. No. 47,270, filed June 18, 1970.

The moving system of the linear accelerometer mechanism is designed so that it is substantially neutrally buoyant. The box 46 provides a buoyant volume displacement and makes possible automatic compensation of the scale factor with temperature due to flotation changes as oil density changes with temperature. The mechanism is designed in such a manner that the center of the mass is only slightly removed from the center of the torque coil assembly 48. For example, the mass unbalance can be approximately 700 to 800 dyne centimeters per C. Thus, it can be seen that the moving system is floated in the oil while at the same time there is provided automatic scale factor temperature compensation which is purely mechanical.

By the utilization of the large box 46, the center of buoyancy of the volume of the moving system is very near to the pivot axis formed by the pivot and jewel assemblies 56. For this reason, as oil density changes with temperature, there is a very slight change in flotation which changes the effect of mass unbalance with temperature that counteracts the decrease in permanent magnet field with temperature. Thus, it can be seen that there is automatic temperature compensation in this linear accelerometer mechanism.

The center of the mass of the moving system is slightly to one side of the center of the torque coil 48 so that there is created force which tends to turn the moving system as acceleration is applied to the mechanism. Since the moving system is neutrally buoyant, it greatly reduces the forces on the pivot and jewel assemblies 56.

The double magnets 21 which are utilized in the end or cover assemblies 11 and 12 on opposite sides of the center assembly 13 serve to provide a linear accelerometer mechanism which has excellent linearity as, for example, 0.01 to 0.02, with no adjustments or compensations.

The loading which is placed on the pivot and jewel assemblies 56 can be readily adjusted by the cantilever spring assemblies which include the springs 59. As hereinbefore described, the springs are cantilevered. In addition, the construction is such so that the preloading on the cantilevered springs 59 can be readily adjusted by means of the screws 67. By adjusting the screws 67, the preload force which is exerted on the cantilever springs 59 can be readily adjusted by varying the force which is applied by the coil springs 66. By way of example, it was found that leaf springs having a spring rate of 88 grams per 0.010 inch of movement and coil springs having a spring rate of approximately 60 grams per 0.010 inch of movement were satisfactory. However, it should be pointed out that, if desired, the spring rate of the coil spring could be larger than the spring rate of the cantilever spring. By having a low spring rate for the coil spring and having screws 67 with a very fine thread, it is possible to obtain a very fine adjustment of the preload force which is placed on the moving system.

The cantilever springs 59 provide a stiffness in two directions for the moving system and compliance in a third direction. Compliance is desired in the third direction so as to make it possible for the linear accelerometer mechanism to withstand very substantial shock forces in the third direction. This protects the pivot and jewel assemblies 54 and 56 so that the pivot will not degrade the jewel when large shock forces are applied to the mechanism. Thus, by way of example, it has been found that mechanisms of this type can readily withstand 60 to 100 G shocks along the pivot axis without damaging the pivot and jewel assemblies. Similarly, it has been found that such mechanisms can withstand 15 G and 25 G RMS vibrations without damaging the pivot and jewel assemblies.

The two pick-off coils 81 and 82 are provided for sensing the position of the paddle 52 when the linear accelerometer mechanism is subjected to acceleration forces in a direction which is parallel to the axis of the torque coil assembly 48 or, in other words, which is in a direction perpendicular to the paddle 52.

As previously pointed out, the linear accelerometer mechanism is spin compensated by the positioning of the screw 76. This makes it possible to spin the linear accelerometer mechanism about an axis that is parallel to the sensitive axis of the mechanism without introducing appreciable error in any acceleration sensed by the instrument. Thus, the linear accelerometer mechanism is particularly useful in strap-down guidance systems that operate in conjunction with spin compensated or spin stabilized missiles.

It is well known that a moving system in a linear accelerometer mechanism will exhibit torques when it is spun because of the mass unbalances along the sensitive axis and also because of dissymmetries in the construction of the moving system that come in as products of inertia along different axes. To obtain the desired spin compensation in the present linear accelerometer mechanism, the moving system has been made as symmetric as possible about two planes. One of the planes is a plane which extends longitudinally of the moving system and splits the moving system in half by passing through the two pivots and splits the torque coil and the paddle. This plane is perpendicular to the sensitive axis of the accelerometer. The other plane extends through the torque coil, the support arm, the float and the paddle, and is perpendicular to the other plane. The spin compensation screw 76 is adjusted in a direction which is parallel to the sensitive axis of the torque coil. By adjusting the screw, it is possible to adjust the mass unbalance so that the spin offset from the moving system is minimized. If the mechanism were not spin stabilized, a bias error would appear in the output of the accelerometer which would be proportional to the square of the spin rate.

The linear accelerometer mechanism also has the advantage in that the bellows 10 are located in an area which is readily accessible and open to the inside of the mechanism. The fact that the bellows are open to the interior of the mechanism minimizes the trapping of bubbles or voids in the mechanism when it is filled with oil.

Since the two bellows 19 are within the main chamber 18 of the mechanism, it has been found that these two bellows in conjunction with the oil within the mechanism can act like a spring and mass system and which can move back and forth at a resonant frequency as, for example, a resonant frequency of approximately 700 cycles. This moving oil acts on the moving system and applies torque to the moving system at this resonant frequency which can actually provide a peak in the output of the electronics. This can be readily eliminated by rolling off the electronics at a much lower frequency so that at the resonant frequency, signals are sufficiently attenuated as, for example by, 20 db so that this resonant frequency will not have a significant effect on the output of the accelerometer.

The double magnet system provides excellent linearity of the magnetic field. The two steel covers which are utilized in conjunction with the double magnets ensure that external magnetic fields will be kept out of the area in which the torque coil 48 moves so that the magnetic susceptibility of the mechanism is very low.

In operation of the linear accelerometer mechanism, the pick-off coils 81 and 82 sense any movement of the paddle 52 and, as explained in copending application Ser. No. 47,270, filed June 18, 1970, now U.S. Pat. No. 3,707,091, a current proportional to the acceleration to which the linear accelerometer mechanism is subjected is supplied to the torque coil 48. This current flow in the torque coil causes a restoring force to be applied to the paddle 52 to return it to a null position between the two pick-off coils 81 and 82.

It is apparent from the foregoing that there has been provided a linear accelerometer mechanism which has many advantageous features and which is still relatively simple and economical to construct.

I claim:

1. In a linear accelerometer mechanism, a housing, a pendulous member, a torque coil carried by said pendulous member, a conducting planar element carried by the pendulous member, pick-off means mounted within the housing in the vicinity of the planar element, means for pivotally mounting said pendulous member in said housing, said mounting means including first and second spaced cantilevered supports mounted within the housing, means for pivotally mounting the pendulous member on the free ends of the spaced cantilevered supports, adjustable means for applying a predetermined preload force to the cantilevered supports, said last named means including spring means engaging the free ends of the cantilevered supports, and means for adjusting the force applied by the spring means to the cantilevered supports.

2. A mechanism as in claim 1 together with float means carried by the pendulous member so that the pendulous member, the torque coil and the float means are substantially neutrally buoyant within the housing.

3. In a linear accelerometer mechanism, a housing, a pendulous moving system assembly comprising a float, lever arm means with one end secured to the float, a torque coil assembly secured to the other end of the lever arm means and a conducting element movable with the torque coil assembly, pivot and bearing means for pivotally mounting the pendulous moving system assembly within the housing about a predetermined pivot axis, a liquid in said housing in which said moving system is disposed, said float being of a size so that the moving system is substantially neutrally buoyant, said moving system being assymetric geometrically about the pivot axis with the lever arm means, the torque coil assembly and the conducting element being disposed on one side of the pivot axis and defining a pendulum having a pendulum axis at right angles to the pivot axis, a major portion of the float being disposed on the other side of the pivot axis, said major portion of the float serving to position the center of buoyancy of the moving system, said float being mounted eccentrically of the pivot axis in a direction away from the torque coil assembly so that the center of buoyancy of the pendulous moving system is positioned so that it is spaced from but is near to the pivot axis by a predetermined distance and pick-off means mounted within the housing in the vicinity of the conducting element, the center of mass of the pendulous moving assembly assembly being displaced from the pivot axis by a distance greater than the dimension of the float along the pendulum axis.

4. A mechanism as in claim 3 wherein said support member of said torque coil assembly and said conducting element lie in generally the same plane and wherein said float has a rectangular box-like configuration.

5. A mechanism as in claim 3 together with first and second magnet means mounted in said housing on opposite sides of said torque coil assembly, each of said first and second magnet means including a pole piece and wherein said torque coil assembly surrounds said pole pieces, said pole pieces of said first and second magnet means having substantially no spacing therebetween.

6. A mechanism as in claim 5 wherein said torque coil assembly is substantially circular and has a central opening therein and wherein said pole pieces extend into said central opening.

7. A mechanism as in claim 3 wherein said pick-off means consists of first and second coils disposed on opposite sides of the conducting element.

8. In a linear accelerometer mechanism, a housing, a pendulous moving system assembly comprising a float, said float having a rectangular box-like configuration, a support arm with a base portion and an apex portion opposite said base and forming a relatively long lever arm, a torque coil assembly mounted on said apex portion of said support arm, a conducting element movable with said torque coil assembly, pivot and bearing means for mounting said pendulous moving system assembly within the housing for pivotal movement about a predetermined pivot axis, a liquid in said housing in which said moving system is disposed, said float being of a size so that the moving system is substantially neutrally buoyant, said pendulous moving system being assymetric geometrically about the pivot axis with the lever arm means, the torque coil assembly and the conducting element being disposed on one side of the pivot axis and defining a pendulum having a pendulum axis at right angles to the pivot axis, a major portion of the float being disposed on the other side of the pivot axis, said major portion of the float serving to position the center of buoyancy of the moving system, said float being mounted eccentrically of the pivot axis in a direction away from the torque coil assembly so that the center of buoyancy of the moving system is positioned so that it is spaced from but is near to the pivot axis by a predetermined distance and pick-off means mounted within said housing adjacent said conducting element for providing an output related to the position of said moving system about said pivot axis relative to said housing, the center of mass of the pendulous moving system assembly being displaced from the pivot axis by a distance greater than the dimension of the float along the pendulum axis.

9. In a linear accelerometer mechanism, a housing, a moving system assembly comprising a float, a support arm with one end mounted upon the float, a torque coil assembly mounted upon the other end of the support arm, and a conducting element movable with the torque coil assembly, pivot and bearing assemblies for pivotally mounting the moving system assembly within the housing about a predetermined pivot axis so that the torque coil assembly and the conducting element are disposed on one side of the axis and a major portion of the float is disposed on the other side of the axis, a liquid in said housing in which said moving system is disposed, said float being mounted eccentrically of the pivot axis so that the center of buoyancy of the volume of the moving system is spaced from but is near to the pivot axis and pick-off means mounted within the housing in the vicinity of the conducting element at least one of said pivot and bearing assemblies including a cantilevered member carried the the housing, spring means engaging the cantilevered member and applying a pre-load force between the pivot and bearing of said one pivot and bearing assembly and means for adjusting the force supplied by the spring means to the cantilevered member to adjust the pre-load force.

10. In a linear accelerometer mechanism, a housing, a liquid filling said housing, a pendulous member, means pivotally mounting said pendulous member in said housing for movement about a pivot axis, a torque coil carried by said pendulous member, magnet means mounted in said housing to establish a magnetic field in the vicinity of the torque coil, a planar conducting element movable with the pendulous member, pick-off means mounted within the housing adjacent the conducting planar element and float means carried by the pendulous member and being eccentrically mounted with respect to said pivot axis, said torque coil and said planar conducting element being disposed on one side of the pivot axis and a major portion of the float means being disposed on the other side of the pivot axis, said pendulous member, said float means, said conducting planar element and said torque coil forming a moving system which is disposed in said liquid, the center of buoyancy of the volume occupied by said moving system being spaced from but being relatively near to the pivot axis, said means for pivotally mounting said pendulous member including at least one cantilevered member secured to the housing, and means carried by the housing for adjusting the force applied to the cantilevered member including spring means engaging the cantilevered member at a point removed from where it is secured to the housing.

11. A mechanism as in claim 10 wherein said means for adjusting the force applied to the cantilevered member includes adjustable screw means carried by the housing and causing a force to be applied to the spring.

12. A mechanism as in claim 11 wherein said housing is formed so that said adjustable screw means is accessible from the exterior of the housing.

13. In a linear accelerometer mechanism, a housing, a liquid filling said housing, a pendulous member, means pivotally mounting said pendulous member in said housing for movement about a pivot axis, a torque coil carried by said pendulous member, magnet means mounted in said housing to establish a magnetic field in the vicinity of the torque coil, a planar conducting element carried by the pendulous member, pick-off means mounted within the housing adjacent the conducting planar element and float means carried by the pendulous member and being eccentrically mounted with respect to said pivot axis, said torque coil and said planar conducting element being disposed on one side of the pivot axis and a major portion of the float means being disposed on the other side of the pivot axis, said pendulous member, said float means, said conducting planar element and said torque coil forming a moving system which is disposed in said liquid, the center of buoyancy of the volume occupied by said moving system being spaced from but being relatively near to the pivot axis, a chamber formed in said housing with first and second passages in communication with said chamber and extending out of the housing to permit said housing to be filled with said liquid and means for sealing said wall defining the chamber through which the second passage extends which is inclined upwardly toward said second passage when said first passage is in a vertical position whereby any bubbles present in the liquid will travel upwardly toward and out of said second passage as said chamber is being filled with liquid.

14. In a linear accelerometer mechanism, a housing, a moving assembly comprising a float, a support, a support arm mounted upon the float, a torque coil assembly mounted upon the support arm, and a conducting element carried by the torque coil assembly, pivot and bearing assemblies for pivotally mounting the moving assembly within the housing about a predetermined pivot axis so that the torque coil assembly and the conducting element are disposed on one side of the axis and a major portion of the float is disposed on the other side of the axis and pick-off means mounted within the housing in the vicinity of the conducting element, at least one of said pivot and bearing assemblies including adjustable means for biasing the pre-load force between the pivot and the bearing of said one of said pivot and bearing assemblies, said adjustable means including a cantilevered member carried by the housing and spring means engaging the cantilevered member and means for adjusting the force supplied by the spring means to the cantilevered member.

15. In an accelerometer mechanism, a housing, a movable member, a pair of pivot and bearing assemblies for pivotally mounting said member for movement about a pivot axis, pick-off means for sensing the position of the movable member, and adjustable means for establishing a pre-load force between the at least one of said of pivot and bearing assemblies, said adjustable means including at least one cantilevered member secured to the housing and having the other end extending therefrom and having a bearing of one of said pivot assemblies mounted thereon, means engaging the cantilevered member at a point spaced from the region where the cantilevered member is secured to the housing for applying a force to the cantilevered member, and means carried by the housing for adjusting the force applied to the cantilevered member by said last named means, said means engaging the cantilevered member including a spring, and said means carried by the housing for adjusting the force applied by the cantilevered member including means for applying a force to the spring.

16. A mechanism as in claim 15 wherein said means for applying a force to the spring includes adjustable screw means carried by the housing.

17. A mechanism as in claim 15 wherein said housing is formed so that said adjustable screw means is accessible from the exterior of the housing.

18. In an accelerometer mechanism, a housing having a chamber therein, a movable member, means mounting said movable member within said housing to permit movement thereof in said chamber, pick-off means mounted within said housing in said chamber to sense movement of said movable member, said housing having first and second passages extending therethrough and opening into said chamber, a liquid filling said chamber and removable means mounted in said housing closing said passage, said housing having at least one side wall defining a portion of the chamber which is inclined upwardly from the horizontal toward the second passage and extending to said second passage when said first passage is in a position so that the chamber can be filled through the first passage whereby any bubbles which are formed in the chamber will travel upwardly and along the inclined side wall and escape through the second passage so that there are no entrapped bubbles in the liquid in the chamber after the chamber has been filled with the liquid.

19. In an accelerometer mechanism, a housing, a movable member, a pair pivot and bearing assemblies for pivotally mounting said movable member for movement about a pivot axis, pick-off means for sensing the position of said movable member relative to said housing, adjustable means for establishing a pre-load force between at least one of said pair of pivot and bearing assemblies, said adjustable means including at least one cantilevered member secured to said housing and having a bearing of one of said pivot assemblies mounted on the cantilevered end thereof, means engaging said cantilevered member at a point spaced from the region where said cantilevered member is secured to said housing for applying a force to said cantilevered member, and means carried by said housing for adjusting said force applied to said cantilevered member by said means engaging said cantilevered member.

20. In a linear accelerometer mechanism, a housing, a liquid filling said housing, a pendulous member, means pivotally mounting said pendulous member in said housing for movement about a pivot axis, a torque coil carried by said pendulous member, magnet means mounted in said housing to establish a magnetic field in the vicinity of said torque coil, a planar conducting element carried by said pendulous member, pick-off means mounted within said housing adjacent to said planar conducting element, float means carried by said pendulous member and being eccentrically mounted with respect to said pivot axis, said torque coil and said planar conducting element being disposed on one side of said pivot axis and a major portion of said float means being disposed on the other side of said pivot axis, said pendulous member, float means, planar conducting element and torque coil forming a moving system which is disposed in said liquid, the center of buoyancy of the volume occupied by said moving system being spaced from but being relatively near to said pivot axis, said means for pivotally mounting said pendulous member including pivot and bearing assemblies, adjustable means for biasing the pre-load force in said pivot and bearing assemblies, said adjustable means including at least one cantilevered member secured to said housing, and means carried by said housing for applying force to said cantilevered member at a point removed from the point where it is secured to said housing.

21. In a linear accelerometer mechanism, a center assembly and first and second magnet assemblies, the center assembly comprising a body having first and second openings therein and a passage interconnecting the opening, a pendulous member disposed in said passage and extending between said first and second openings in said body, means pivotally mounting said pendulous member on said body for movement about a pivot axis, a torque coil carried by said pendulous member and being disposed in said first opening in the body, a planar conducting element movable with the pendulous member, pick-off means disposed adjacent the conducting planar element, a float carried by the pendulous member disposed in said second opening in said body and being eccentrically mounted with respect to said pivot axis, said torque coil and the planar conducting element being disposed on one side of the pivot axis and a major portion of the float being disposed on the other side of the pivot axis, said first and second magnet assemblies comprising a magnet, a pole piece carried by the magnet, and a structure formed of a magnetic material forming a flux return path for the magnet, means for mounting said first and second magnet assemblies on said body so that the pole pieces of said magnetic assemblies are disposed in the vicinity of the torque coil to establish a magnetic field in the vicinity of the torque coil, a liquid-tight housing enclosing said center assembly and said first and second magnet assemblies, a liquid filling said housing and said body of said center assembly, said pendulous member, said float said conducting planar element and said torque coil forming a moving system which is disposed in said liquid, the center of buoyancy of the volume occupied by the moving system being spaced from but being relatively near to the pivot axis, said float being of a size so that the moving system is substantially neutrally buoyant.

22. In a linear accelerometer mechanism, a center assembly and first and second magnet assemblies, the center assembly comprising a body having first and second openings therein and a passage interconnecting the opening, a pendulous member disposed in said passage and extending between said first and second openings in said body, means including a pair of pivot and bearing assemblies pivotally mounting said pendulous member on said body for movement about a pivot axis at right angles to the longitudinal axis of the pendulous member, a torque coil carried by said pendulous member and being disposed in said first opening in the body, a planar conducting element movable with the pendulous member, pick-off means disposed adjacent the conducting planar element, a float carried by the pendulous member disposed in said second opening in said body and being eccentrically mounted with respect to said pivot axis, said torque coil and the planar conducting element being disposed on one side of the pivot axis and a major portion of the float means being disposed on the other side of the pivot axis, said first and second magnet assemblies comprising a magnet, a pole piece carried by the magnet, and a structure formed of a magnetic material forming a flux return path for the magnet, means for mounting said first and second magnet assemblies on said body so that the pole pieces of said magnetic assemblies are disposed in the vicinity of the torque coil to establish a magnetic field in the vicinity of the torque coil, a liquid-tight housing enclosing said center assembly and said first and second magnet assemblies, a liquid filling said housing and in said body of said center assembly, said pendulous member, said float, said conducting planar element and said torque coil forming a moving system which is disposed in said liquid, the center of buoyancy of the volume occupied by the moving system being spaced from but being relatively near to the pivot axis, said float being of a size so that the moving system is substantially neutrally buoyant, at least one of said pivot and bearing assemblies including a cantilevered member carried by the body, spring means engaging the cantilevered member and applying a preload force between the pivot and bearing of said one pivot and bearing assembly and means for adjusting the force supplied by the spring means to the cantilevered member to adjust the preload force.

23. A mechanism as in claim 22 wherein said torque coil assembly is substantially circular and has a central opening therein and wherein said pole pieces extend into said central opening.

* * * * *